United States Patent [19]

Gilleo et al.

[11] 3,888,822

[45] June 10, 1975

[54] PROCESS FOR INCREASING FLAME RESISTANCE OF NYLON AND RESULTING FLAME RESISTANT NYLON COMPOSITION

[75] Inventors: Kenneth B. Gilleo, Depew; Francis E. Evans, Hamburg; Allen W. Sogn, Williamsville, all of N.Y.

[73] Assignee: Allied Chemical Corporation, New York, N.Y.

[22] Filed: Dec. 17, 1973

[21] Appl. No.: 425,488

[52] U.S. Cl. .................. 260/45.8 NT, 260/45.75 R, 260/45.75 C, 260/45.8 N
[51] Int. Cl. ............................................. C08f 45/58
[58] Field of Search 260/45.8 NT, 45.8 N, 45.75 R, 260/45.75 C

[56] References Cited
UNITED STATES PATENTS

| | | | |
|---|---|---|---|
| 3,250,772 | 5/1966 | Dexter et al. | 260/45.8 NT |
| 3,293,249 | 12/1966 | Biland et al. | 260/45.8 NT |
| 3,415,824 | 12/1968 | Biland et al. | 260/45.8 NT |
| 3,444,142 | 5/1969 | Kolyer et al. | 260/45.8 NT |
| 3,538,092 | 11/1970 | Dexter et al. | 260/45.8 NT |
| 3,709,883 | 1/1973 | Dexter et al. | 260/45.8 NT |
| 3,793,289 | 2/1974 | Koch et al. | 260/45.8 NT |

*Primary Examiner*—Melvyn I. Marquis
*Attorney, Agent, or Firm*—Michael L. Dunn; Jay P. Friedenson

[57] ABSTRACT

A process for increasing the flame resistance of nylon comprising treating the nylon with a heterocyclic ring compound which contains both sulfur and nitrogen and the resulting flame resistant nylon composition.

41 Claims, No Drawings

PROCESS FOR INCREASING FLAME RESISTANCE OF NYLON AND RESULTING FLAME RESISTANT NYLON COMPOSITION

This invention relates to nylons exhibiting improved flame resistance. More specifically, this invention relates to nylon treated with compositions which impart improved flame resistance thereto and to the process of so treating the nylon.

In the prior art numerous compounds have been used as additives to carbon containing polymers, including nylon (polycarbonamides), to reduce flammability of the polymers. For example inorganic and organic tin compounds and halogen containing compounds have been used to reduce flammability of nylon. These compounds have not, however, been entirely successful.

In addition to the tin containing compounds and halogen containing compounds, some compounds, containing nitrogen and sulfur have been employed to improve flame resistance. For example thiourea and compounds containing non-cyclic imine groups have been used. Thiourea, while being an improvement over the tin and halogen compounds, still does not create as much flame resistance as is desired, or necessary, and the compounds containing imine groups do not give the desired flame resistance and, due to the imine group, hydrolize when contacted with water thus preventing the formation of a permanent application of the compounds to the nylon or other carbon containing polymers.

Other compounds containing both sulfur and nitrogen which have been suggested to impart flame resistance to nylon have been found to be inadequate since they contain too much carbon in relation to the amount of other elements present in the compound or the carbon is present in a single flammable chain of excessive length, which chain will easily burn.

BRIEF DESCRIPTION OF THE INVENTION

In accordance with the process of this invention it has now been discovered that nylon can be treated with certain additive compounds containing sulfur and nitrogen to give a flame resistance which is superior to the flame resistance obtainable by any known prior art compound or method.

The additive compounds, with which the nylon is treated, have the formula:

$$(R_1)_n-Q=(R_2)_m$$

wherein Q is a saturated or unsaturated heterocyclic ring structure, which may be substituted or unsubstituted, containing at least one sulfur or nitrogen atom in the ring; $R_1$ is independently at each occurrence a monovalent radical containing at least one sulfur or nitrogen atom; $R_2$ is independently at each occurrence a divalent radical containing at least one sulfur or nitrogen atom; $n$ is 0 or an integer of 1 through 6 and $m$ is 0 or an integer of 1 through 3 and the sum of $n$ and $2m$ is no greater than six with the proviso that said compound contains at least one nitrogen atom and at least one sulfur atom, contains no non-cyclic imine group, and the ratio of the number of carbon atoms in the compound to the total number of atoms having an atomic number greater than 2 other than carbon in the compound being 2:1 or less, said compound including no carbon chain containing over six and preferably not over five carbon atoms, no hexavalent sulfur which is directly bonded to a carbon atom and no phosphorous or arsenic.

The novel composition in accordance with the invention comprises nylon containing from about 0.5 to about 25 weight percent of a compound or a mixture of compounds having the above formula.

DETAILED DESCRIPTION OF THE INVENTION

In accordance with this invention nylon is treated with at least about 0.5 weight percent and preferably at least about 2 weight percent of a compound or a mixture of compounds falling within the above formula. Generally less than about 25 weight percent, preferably less than about 16 weight percent, and most preferably less than about 8 weight percent of the compound or mixture of compounds is used since generally greater percentages do not materially increase flame resistance and can sometimes cause undesirable effects such as flaking on the surface of the nylon.

The nylon may be treated by wetting the surface with a solution or emulsion containing one or more of the above compounds or one or more of the compounds may be added to the nylon polymerization reactants or to the nylon melt prior to the formation of polymeric products, e.g. a nylon fiber.

The compounds which are added to the nylon polymerization reactants should of course be stable under the conditions of polymerization, should not interfere with the polymerization and should be stable in the nylon melt. An example of such a compound is:

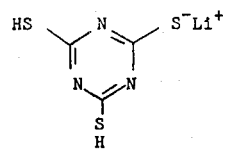

Compounds added to the nylon melt should be stable in the melt and should not deleteriously affect the nylon. Examples of such compounds are:

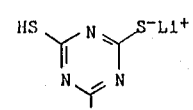 , 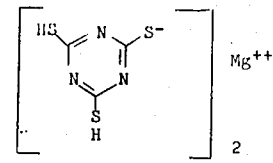

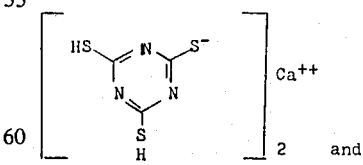 and 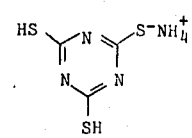

Q in the above formula for the compounds may be any substituted or unsubstituted heterocyclic ring containing at least one sulfur or nitrogen atom in the ring.

The substituents e.g. -COOH or -OH upon the ring should of course not contribute to flammability although hydrogen and small amounts of carbon can be tolerated. The heterocyclic ring, exclusive of substituents, contains from four through six atoms; and contains either sulfur or nitrogen, preferably both. Three membered rings are unsuitable and not included in that they are unstable.

Examples of suitable heterocyclic rings, Q, which may be saturated or unsaturated, are: six membered rings containing nitrogen including azine, diazine, triazine, tetrazine and pentazine rings; six membered rings containing sulfur including dithiin and thiopyran rings; six membered rings containing both nitrogen and sulfur including thiatriazine, thiadiazine, dithiadiazine, dithiazine and thiazine rings; five membered rings containing nitrogen including azole, diazole, triazole and tetrazole rings; five membered rings containing sulfur including thiole and dithiole rings; five membered rings containing both nitrogen and sulfur including thiazole and thiadiazole rings; four membered rings containing nitrogen including azete, diazete and triazete rings; four membered rings containing sulfur including thietane rings and four membered rings containing both sulfur and nitrogen including thiazete rings.

Preferably Q is triazine, diazine, thiatriazine, thiadiazine, triazole, diazole, thiazole and thiadiazole rings, since the five and six membered rings are generally more stable than the four membered rings and since the rings containing more nitrogen and sulfur atoms in relation to the number of carbon atoms provide less fuel for combustion.

The heterocyclic rings containing both sulfur and nitrogen in themselves impart good flame resistance in accordance with this invention but may be even further improved through the addition of appropriate substituent groups $R_1$ and $R_2$. The heterocyclic rings in accordance with this invention which contain only nitrogen or sulfur require at least one substituent group containing sulfur or nitrogen respectively so that the compound as a whole will contain both sulfur and nitrogen.

The compound preferably contains at least some divalent or tetravalent sulfur since hexavalent sulfur is completely oxidized and cannot react to stop decomposition and combustion. The most preferred compounds are those containing no hexavalent sulfur.

Substituent groups $R_1$ and $R_2$ have essentially the same characteristics except $R_1$ is a monvalent radical other than hydrogen and is attached to a single atom within the heterocyclic ring and $R_2$ is polyvalent and may be attached to one or more atoms within the heterocyclic ring. The $R_1$ and $R_2$ groups must contain sulfur, nitrogen or both sulfur and nitrogen and should preferably contain only a sufficient number of carbon atoms to maintain chemical stability. The fewer carbon atoms in the $R_1$ and $R_2$ groups, the less fuel is available for combustion. In general, unless a polymeric material containing sulfur and nitrogen is used to impart flame resistance, each of the $R_1$ and $R_2$ groups contains fewer than 10 total atoms, other than hydrogen to simplify synthesis of the compound.

The compound preferably contains at least some divalent or tetravalent sulfur since hexavalent sulfur is completely oxidized and is believed unable to react to stop combustion or decomposition of the nylon. The most preferred compounds are those containing no hexavalent sulfur and in general the sulfur, if any may be hexavalent only if it is not directly connected to a carbon atom, and the compound contains no halogen or phosphorous since halogen or phosphorous tends to degrade nylon and since it is believed that the presence of phosphorous and halogen tends to form toxic products during combustion. Arsenic is also not used because of possible toxic products.

Examples of some preferred $R_1$ radicals are -SH; $-NR_3R_4$ wherein $R_3$ and $R_4$ are independently at each occurrence hydrogen or methyl;

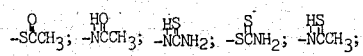

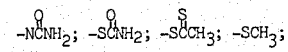

$-SCH_3$; $-SCN$; or $-SM$ wherein M is an ion having a single positive charge preferably selected from simple or complex ions of ammonium, Li, Na, K, Cs, Mg, Sn, Ni, Cu, Ti, Zr, Cr, Mn, Fe, Co, Zn and Al. As used herein "complex ion" means an ion formed by the combination of an ion of one of the above listed metals with another ion or with an atom or molecule. Examples of complex ions contemplated by this invention are: $^+CaA$, $^+MgA$, $^+SnA$, $^+SnA_3$, $^+NiA_2$, $^+CuA$, $^+TiA_2$, $^+TiA_3$, $^+ZrA_3$, $^+CrA_2$, $^+CrA$, $^+MnA$, $^+MnA_2$, $^+FeA$, $^+FeA_2$, $^+CoA$, $^+CoA_2$, $^+ZnA$, $^+AlA_2$, $^+SnAD$, $^+NiD$, $^+TiD$, $^+TiAD$, $^+ZrAD$, $^+CrD$, $^+MnD$, $^+FeD$, $^+CoD$, $^+AlD$, $^+SnPO_4$, $^+TiPO_4$ and $^+ZrPO_4$ where A independently at each occurrence is halogen$^-$, $BO_2^-$ or

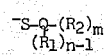

where $R_1$, $R_2$, n, m and Q are as defined herein; and where D is independently at each occurrence $CO_3^=$ or $S^=$.

The most preferred $R_1$ radicals are $-SH$, $-NH_2$ and $-SM$ where M is ammonium, Li, or the complex ions of Ca or Mg. $R_1$ may also be a carbon containing radical which must also contain sulfur, nitrogen or both sulfur and nitrogen and which is free from non-cyclic imine groups and which carbon containing radical contains no more than 55 weight percent carbon. "Non-cyclic imine group," as used herein, means that the imine group double bond does not form part of a heterocyclic ring.

The $R_1$ group may be or may contain any additional heterocyclic ring containing sulfur, nitrogen or both sulfur and nitrogen joined to Q by a single bond.

An advantage of using $-SH$ as an $R_1$ radical is that the $-SH$ group seems to prevent the formation of volatile and combustible products. Reduction of volatiles seems to be evidenced by difficult ignition of nylon which has been exposed to Q containing a $-SH$ radical at elevated temperatures.

$-S^-NH_4^+$ as a $R_1$ radical seems to function in a manner similar to $-SH$; however, the ionic character of the $-S^-NH_4^+$ radical also enhances solubility characteristics.

$-SM$ as an $R_1$ radical seems to operate in a manner somewhat dissimilar to the $-SH$ and $-S^-NH_4^+$ groups in that Q containing a $-SM$ group seems to form an essentially non-combustible insulating char which results during combustion of the nylon. This char is particularly advantageous in reducing flammability of carpeting by insulating the carpet backing and the nylon fiber from an ignition source.

—NH₂ groups in the R₁ position seem to act synergistically with sulfur containing groups thus reducing the amount of the composition which is required to provide increased flame resistance. In addition, a —NH₂ group in the R₁ position seems to increase the substantivity of the compound added to the nylon thus increasing durability. A —NH₂ group in the R₁ position can also be reacted upon the nylon with a reactant such as formaldehyde to form a resin upon the nylon surface which increase flame resistance.

Examples of some preferred R₂ groups are =S, and any heterocyclic rings containing sulfur, nitrogen or both sulfur and nitrogen, such as

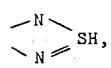

which heterocyclic ring is fused with one or more atoms in Q.

Examples of particular compounds which have been found useful in forming flame resistant nylon compositions with a suggested method for preparation are as follows:

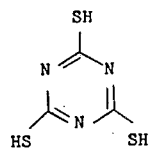

trithio-s-triazine
(trithiocyanuric acid)

Preparation: Add 0.1 mole of cyanuric chloride to a refluxing solution of 0.3 mole of thiourea in 200 ml acetone and heat for 1 hour. Filter solid and hydrolyze with 10% NaOH solution. Neutralize with 10% HCl and filter the resulting precipitate.

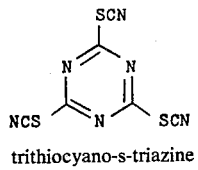

trithiocyano-s-triazine

Preparation: A mixture of 0.1 mole of cyanuric chloride and 0.3 mole of KSCN is heated at reflux for 20 hr. in 200 ml of acetone. Filtration gives 35 g. of orange solid product.

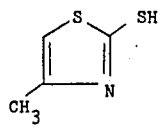

methylmercaptothiazole

Preparation: Equimolar amounts of ammonium dithiocarbamate

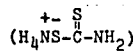

and monochloroacetone are heated on a steam bath for 3 hours. The resulting solid is washed with water and dried. The product is 4-methyl-2-mercapto-1,3-thiazole.

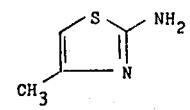

methylaminothiazole

Preparation: Equimolar amounts of thiourea and monochloroacetone are heated on a steam bath. Heating is maintained for 5 hours. The solid residue is washed with water and dried to yield 4-methyl-2-amino-1,3-thiazole.

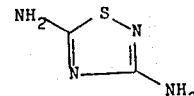

3,5-diamino-1,2,4-thiadiazole

Preparation: A solution of 10 g. of amidinothiourea

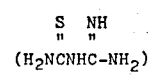

in 100 ml water is treated with 10 ml of 30% H₂O₂. The solution is heated at 50°C. for 1 hour. Solvent is removed by evaporation to give 8 g. of 3,5-diamino-1,2,4-thiadiazole.

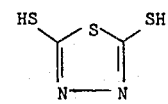

2,5-dimercapto-1,3,5-thiadiazole

Preparation: To a cold solution of 10 g. hydrazine hydrate in 100 ml ethanol saturated with NH₃, 17 g. carbon disulfide is added. The mixture is evaporated on a steam bath. The resulting residue is dissolved in boiling water and filtered. An equal volume of ethanol is added to the filtrate, which is then acidified with concentrated HCl until crystals form. On cooling, 18 g. of product are formed.

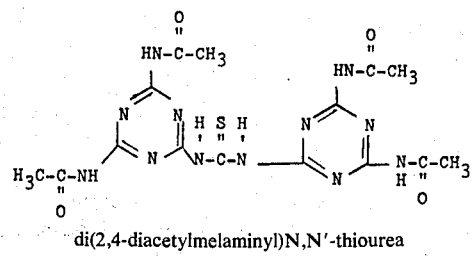

di(2,4-diacetylmelaminyl)N,N'-thiourea

Preparation: A flask is charged with 38 g. of KOH, 42 ml of CS₂, 600 ml of 95% ethanol, and 90 ml of water. 75.6 grams of melamine is then added and the mixture is heated for 3 hours. Activated charcoal is then added to clarify the resulting solution. The mixture is then filtered to give an amber solution. The solution is then heated at 60°–70°C. with 600 ml of water and 50 ml of acetic acid in 100 ml of water for 5 minutes. The solution is then cooled in an ice bath which results in crystals of the desired product which are filtered from the liquid. The product has a melting point of over 360°C.

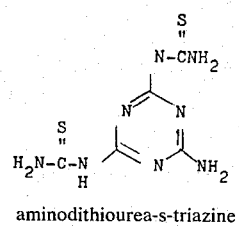

aminodithiourea-s-triazine

Preparation: The dihydrochloride of melamine is prepared by adding 55 ml of HCl to 37.8 g. (0.3 mole) of melamine in 300 ml of warm water. 50 g. (0.66 mole) of ammonium thiocyanate are then added to the mixture. The mixture is then heated on a steam bath for about 1 hour to evaporate the liquid. The solid is then redispersed in 350 ml of water and the water is again evaporated. 300 additional ml of water are then added, the mixture is filtered and the solid product is recovered. The product has a melting point of over 360°C.

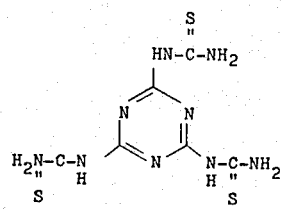

s-triazinetrithioureide
(trithiourea-s-triazine)

Preparation: Melamine hydrochloride is prepared by adding 87 ml of concentrated HCl to 37.8 g. (0.03 mole) of melamine in 300 ml of water. 75 g. (0.99 mole) of NH₄SCN is then added and the solution is evaporated on a hot plate at 120°C. The solids are then powdered and redispersed in 350 ml of water. The mixture is then again evaporated to dryness. The solids are again redispersed in 250 ml of water and the resulting slurry is filtered to obtain the product which has a melting point over 360°C.

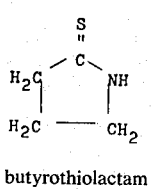

butyrothiolactam

Preparation: A flask is charged with 2 moles of butyrolactam and 1.4 moles of water. The mixture is then heated to 55°–60°C. to form a solution. 0.64 mole of phosphorous pentasulfide is then added in small increments over a 2 hour period while maintaining the temperature between 60° and 100°C. A thick paste forms which is then heated to 115°C. for 20 minutes. The paste is then poured into 1,100 ml of water at 80°C. and is stirred while the mixture is heated to 90°C. until most solids dissolve. The mixture is then cooled to room temperature and the resulting butyrothiolactam crystals are filtered from the mixture.

Other compounds, known and available in the prior art, which have now been found to impart flame resistant properties to nylon are:

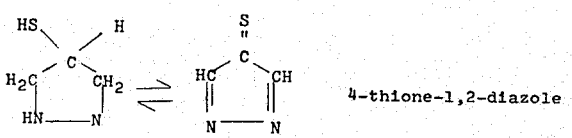

4-thione-1,2-diazole

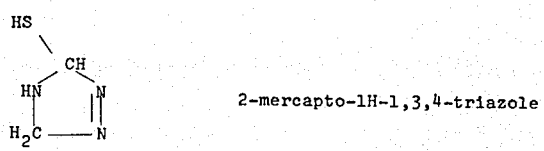

2-mercapto-1H-1,3,4-triazole

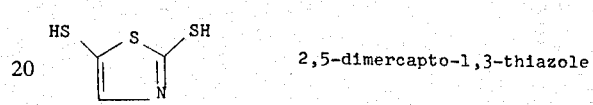

2,5-dimercapto-1,3-thiazole

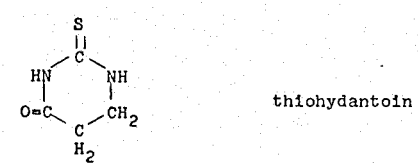

thiohydantoin

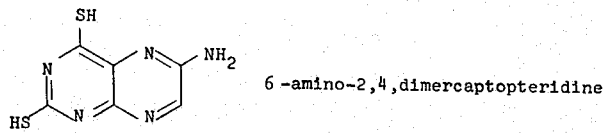

6-amino-2,4,dimercaptopteridine

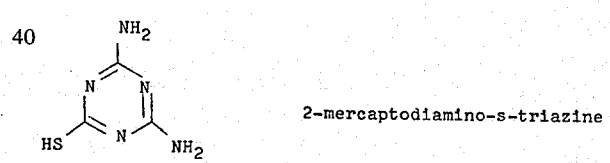

2-mercaptodiamino-s-triazine

2-mercapto-4,6-diamino-1,3-diazine

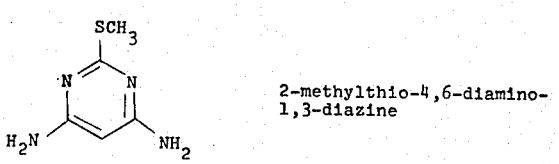

2-methylthio-4,6-diamino-1,3-diazine

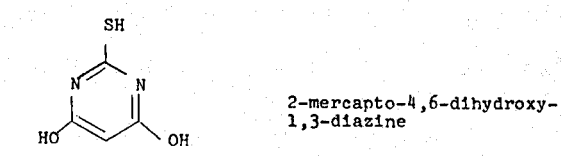

2-mercapto-4,6-dihydroxy-1,3-diazine

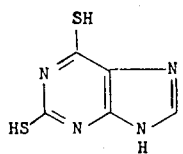 6,8-dimercaptopurine

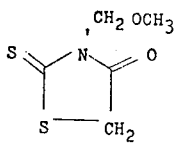 N-methoxy methylene rhodamine

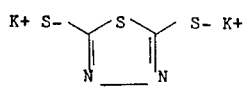 dipotassium salt of 1,5-dimercaptothiadiazole

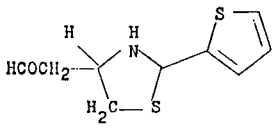 2-(2-thiophenyl)-4-methoxy methylene 1,3-thiazine

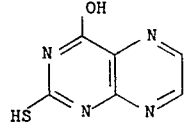 4-hydroxy-2-mercaptopteridine

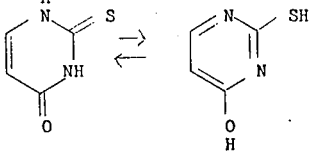 2-mercapto-4-hydroxy-1,3-diazine

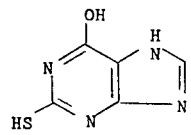 6-hydroxy-2-mercaptopurine

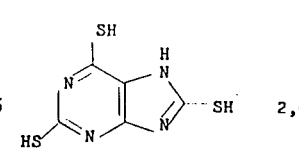 2,6,8-trimercaptopurine

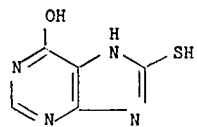 8-mercapto-6-hydroxypurine

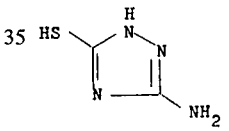 5-bromo-2-amino thiazole hydrobromide

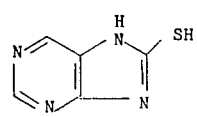 8-mercaptopurine

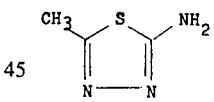 5-amino-3-mercaptotriazole

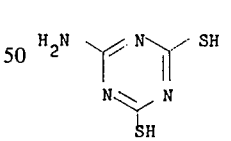 2-amino-5-methyl thiadiazole

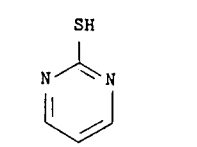 2-mercapto dihydrothiazole

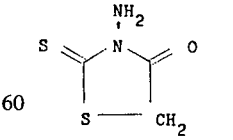 1,3 dimercapto-5-amino-s-triazine

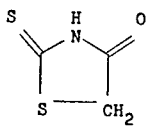 2-mercapto-1,3-diazine

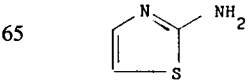 N-aminorhodamine rhodamine 2-amino thiazole

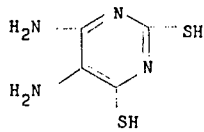 2,4-dimercapto-5,6,-diamino-1,3-diazine

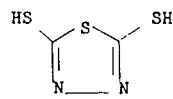 2,5-dimercapto-1,3,4-thiadiazole

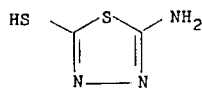 2-amino-5-mercaptothiadiazole

 1,2,5-thiadiazole

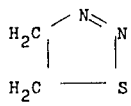 4,5 dihydro 1,2,3-thiadiazole

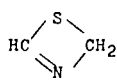 1,3 thiazete

 2-acetoamidothiazole

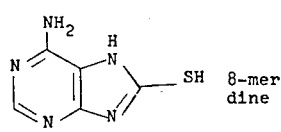 8-mercapto-6-amino pyrazolopyrimidine

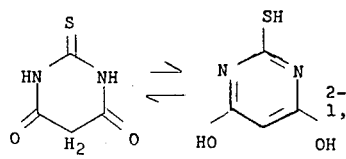 2-mercapto-4,6-dihydroxy-1,3-diazine

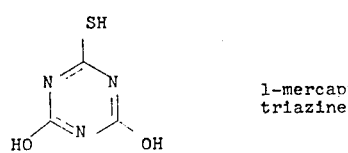 1-mercapto-3,5-dihydroxy-s-triazine

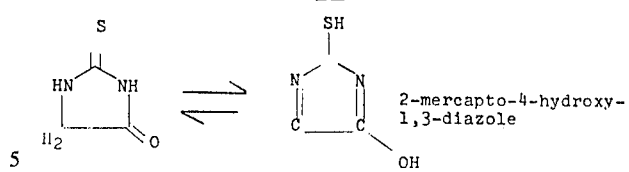 2-mercapto-4-hydroxy-1,3-diazole

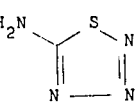 2-mercapto-1,3-4-triazole

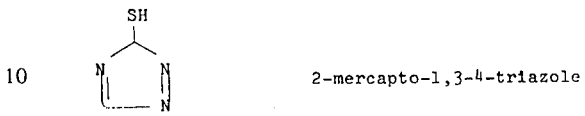 5-amino-1,2,3,4-thiatriazole

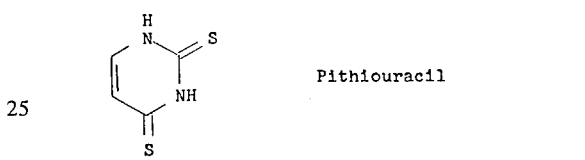 Pithiouracil

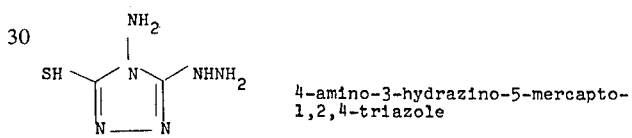 4-amino-3-hydrazino-5-mercapto-1,2,4-triazole

Two of the most preferred compounds are:

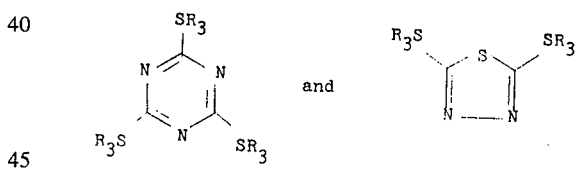 and wherein $R_3$ is H or M, and M is ammonium, Li or a complex ion of Ca or Mg.

In practicing this invention a sulfur-nitrogen containing compound as described herein, is dissolved in solvent, usually water to make a solution of about 0.5 to about 12 weight percent, more preferably from about 2 to about 8 weight percent and most preferably from about 4 to about 6 weight percent. A fabric or carpet is then soaked by the solution which may contain other additives commonly used in finishing baths to improve properties such as penetration or water repellency. The fabric or carpet is then squeezed with any suitable apparatus such as pad rollers, to remove excess solution. The squeezing apparatus, such as the rollers, is adjusted to give from about 25 to about 300 weight percent, preferably from about 50 to 200 weight percent and most preferably from about 75 to about 150 weight percent wet pick up. The fabric or carpet material is then dried in air or in a dryer or oven at temperatures up to about 150°C. but preferably less than about 125°C.

The solution may be applied to the material in numerous ways. For example the material may be immersed in the solution or the solution may be sprayed upon the material or applied to the material by means of pad rolls.

The dry material can be tested for flame retardancy by several methods. In the case of apparel fabric, the Children's Sleepwear Standard is used. A 1½ inch flame from a bunsen burner is applied to the lower edge of a vertically supported fabric. Untreated (control) fabric may burn completely while fabrics composed of the nylon compositions of this invention usually stop burning when the bunsen burner flame is removed indicating that in the absence of an externally applied elevated temperature which may be in the form of a flame, the material is usually self extinguishing.

Upholstery, tapestry and drapery fabrics are tested by holding the fabric over a 1½ inch bunsen burner flame for up to 12 seconds. Untreated fabrics may burn for several minutes, while fabrics made from the nylon compositions of this invention usually extinguish in from 0 to 5 seconds after removal of the burner flame.

The additive compounds of this invention are generally more durable to laundering and dry cleaning than thiourea and are generally much more effective than prior art compounds. For example as little as 0.5 dry weight percent of those compounds described above particularly those containing two or three —SH or —S$^-$NH$_4^+$ groups effectively reduces the flammability of nylon upholstery fabric while as much as 50 – 100 weight percent of prior art phosphorous or halogen containing ocmpounds may be required to accomplish the same result. Nylon compositions containing from about 2 to about 16 dry weight percent of an additive compound of this invention usually pass most generally recognized flammability tests for synthetic fabrics. As much as about 25 dry weight percent can be used to obtain even better flame resistant properties.

The following examples serve to illustrate the process and composition of the invention. Unless otherwise indicated all parts and percentages are by weight.

EXAMPLE 1

A pad bath of the following composition is prepared: 5 g. of trithiocyanuric acid, 20 g. ethylene glycol (as wetting and swelling agent), 7 g. of ammonium hydroxide and 170 g. water. A piece of 16 oz./yd. nylon-6 upholstery fabric 3 × 10 inches is dipped into the solution and squeezed through a wringer (laboratory padder) to obtain a wet pick up (weight increase) of 164% corresponding to a dry chemical add-on of about 4% trithiocyanuric acid. The sample is dried in a horizontal position in a circulating oven at 140°C. for 1 hour.

The sample is placed in a desicator containing CaSO$_4$ drying agent and allowed to cool for 15 min. The sample is tested by the New York Port Authority (NYPA) test whereby it is clamped in a vertical position and a 1½ inch bunsen flame is applied to the lower edge for 12 seconds. After removal of the flame, the fabric burns for 1.2 seconds and has a char length of 2¼ inches.

EXAMPLES 2 – 9

The procedure of Example 1 is followed for Examples 2 – 9 except different compositions and concentrations are used.

The results are set forth in Table I.

TABLE I

| EXAMPLE | TREATING AGENT | % ADD ON | AREA DESTROYED (in²) | AFTER FLAME (sec) | CHAR LENGTH (in) |
| --- | --- | --- | --- | --- | --- |
| 2 | None | — | 10 | 49 | 6.35 |
| 3 | (trithiocyanuric acid triammonium salt) | 2.7 | 2.4 | 18.3 | 2.65 |
| 4 | do. | 3.6 | 1.7 | 9.4 | 2.5 |
| 5 | do. | 3.7 | 1.0 | 4.5 | 2.1 |
| 6 | do. | 5.9 | .98 | 0.14 | 2.5 |
| 7 | HS-thiadiazole-SH | 5.5 | 1.2 | 0.9 | 3.0 |
| 8 | diamino-dithio-bis-triazine | 5.5 | 5.75 | 31 | 3.75 |
| 9 | (thio-heterocycle with C=O) | 6.2 | 2.75 | 9.6 | 3.25 |

EXAMPLES 10 – 17

The procedure of Example 1 is followed except the fabric is a 4 inch × 4 inch piece of nylon 6 carpet backed with jute and the flame test used is a modified United States Department of Commerce Test DOC FF1-70 wherein a 250 watt heat lamp is positioned 5 inches from the carpet surface and is controlled by a Variac. The lamp is turned on for 5 minutes at a pre-set voltage on the Variac in order to provide a more vigorous test. The higher the voltage applied to the heat lamp the greater the heat applied to the carpet prior to burning the carpet. The carpet is burned by placing a 150 mg. methinamine pill in the center of the carpet. The pill is then ignited. The carpet passes the test if the carpet self extinguishes within 60 seconds after the pill has finished burning.

The higher the voltage which can be applied to the heat lamp before the carpet fails, the better the flame resistant properties of the carpet.

The following Table II shows the highest voltage applied to the heat lamp before the carpet fails the test, the additive used, the burn area resulting from the test and the percentages of additive on the carpet.

475 g. of a 4 to 1 weight ratio solution of water and ethylene glycol for 1 minute. The fabric is then run through a small laboratory padder to remove excess liquid. The wet pick up (weight of increase due to weight of absorbed solution) is 110%, corresponding to 5.8% dry add on of tri-thio cyanuric acid. The fabric is dried in a horizontal position in a 110° oven. The fabric is

TABLE II

| EXAMPLE | ADDITIVE | % ADD ON | HIGHEST VOLTAGE BEFORE FAILURE | BURN AREA |
|---|---|---|---|---|
| 10 | 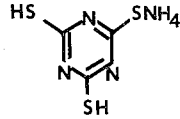 | 2.31 | 60 | 1.25" |
| 11 | 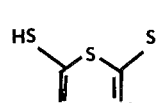 | 10.2 | 60 | — |
| 12 | 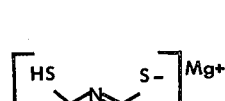 | 15.7 | 120 | 1.0" |
| 13 | 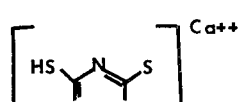 | 10.9 | 90 | 1.25" |
| 14 | 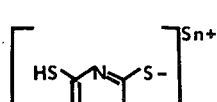 | 10.2 | 90 | 1.0" |
| 15 | 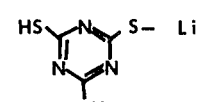 | 9.6 | 120 | 1.0" |
| 16 | 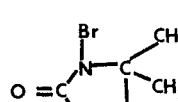 | 10.0 | .0 | complete burn |
| 17 | None | — | 0 | complete burn |

EXAMPLE 18

Lightweight nylon 6 woven apparel fabric is dipped into a bath composed of 25 g. tri-thio-cyanuric acid and then tested by the Federal Children's Sleepwear Flammability Test (FF-3-71). This consists of holding a 1½ inch bunsen burner flame at the lower edge of vertically supported fabric for 3 seconds. The tested sample has an after flame (burning time after flame is removed) of 0 seconds and a char length of 3.9 inches. A control (untreated) piece of fabric has an after flame of 26 seconds and burned 8.6 inches. (Tests are done in quintuplicate and numbers reported are in averages).

What is claimed is:

1. A composition comprising nylon and from about 0.5 to about 25 weight percent of a compound of the formula

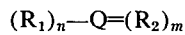

wherein Q comprises a heterocyclic ring structure which may be substituted and contains at least one sulfur or nitrogen atom in the ring; $R_1$ is independently at each occurrence a monovalent radical containing no more than 55 weight percent carbon and at least one sulfur or nitrogen atom; $R_2$ is independently at each occurrence a divalent radical containing fewer than 10 atoms other than hydrogen and at least one sulfur or nitrogen atom; $n$ is 0 or an integer 1 through 6 and $m$ is 0 or an integer of 1 through 3 and the sum of $n + 2m$ is 0 or an integer of 1 through 6, with the proviso that said compound contains at least one nitrogen atom and at least one sulfur atom, contains no non-cyclic imine group, and the ratio of the number of carbon atoms in the compound to the total number of atoms having an atomic number greater than two other than carbon in the compound being 2:1 or less, said compound including no carbon chain containing over six carbon atoms and being free of phosphorous, arsenic, halogens, and hexavalent sulfur which is directly bonded to a carbon atom.

2. The compositions according to claim 1 wherein $R_2$ is selected from

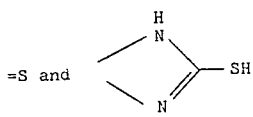

3. The compositions according to claim 1 wherein $R_1$ is selected from —SH; —$NR_3R_4$ wherein $R_3$ and $R_4$ are each independently hydrogen or methyl;

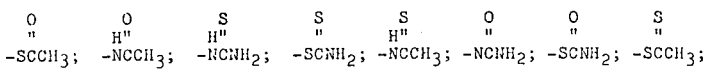

—$SCH_3$; —SCN or —SM wherein M is an ion having a single positive charge selected from simple or complex ions of ammonium, Li, Na, K, Cs, Ca, Mg, Sn, Ni, Cu, Ti, Zr, Cr, Mn, Fe, Co, Zn and Al.

4. The composition according to claim 3 wherein Q is a heterocyclic ring containing nitrogen.

5. The composition according to claim 4 wherein Q is a heterocyclic ring containing both sulfur and nitrogen.

6. The composition according to claim 3 wherein Q is a six membered ring.

7. The composition according to claim 6 wherein Q contains a nitrogen atom in the ring.

8. The composition according to claim 7 wherein Q contains both nitrogen and a sulfur atom in the ring.

9. The composition according to claim 7 wherein Q is an azine ring.

10. The composition according to claim 7 wherein Q is a diazine ring.

11. The composition according to claim 7 wherein Q is a triazine ring.

12. The composition according to claim 7 wherein Q is a tetrazine ring.

13. The composition according to claim 7 wherein Q is a pentazine ring.

14. The composition according to claim 8 wherein Q is a thiatriazine ring.

15. The composition according to claim 8 wherein Q is a dithiadiazine ring.

16. The composition according to claim 8 wherein Q is a dithiazine ring.

17. The composition according to claim 3 wherein $m$ is 0, Q contains from four to six atoms in the ring, at least one of which is a nitrogen atom and $R_1$ is independently at each occurrence —SH, —$NH_2$, —SM or a carbon and sulfur containing radical.

18. The composition of claim 17 wherein the nitrogen containing ring is a triazine.

19. The composition of claim 17 wherein the nitrogen containing ring is a thiadiazole.

20. The composition of claim 17 wherein at least one $R_1$ radical is —SH, or —SM and M is $NH_4$, Li, or a complex ion of Ca or Mg.

21. The composition of claim 18 wherein at least one $R_1$ radical is —SH.

22. A composition according to claim 17 wherein said compound has the formula:

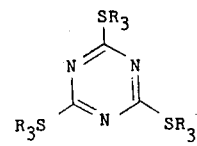

wherein $R_3$ is H or M, where M is ammonium, Li or a complex ion of Ca or Mg.

23. The composition according to claim 22 wherein $R_3$ is hydrogen.

24. The composition according to claim 3 wherein $m$ is 0, Q is a sulfur containing ring radical having from four to 6 atoms in the ring and at least one $R_1$ radical contains nitrogen.

25. The composition according to claim 24 wherein at least one $R_1$ radical is —$NH_2$.

26. The composition according to claim 3 wherein at least one $R_2$ radical is =S.

27. The composition according to claim 26 wherein the compound is:

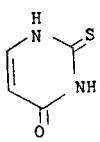

28. The composition according to claim 26 wherein the compound is:

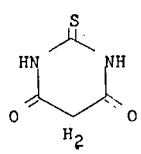

29. The composition according to claim 26 wherein the compound is:

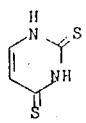

30. A process for forming a nylon composition having improved flame resistance comprising treating nylon with a compound of the formula $$(R_1)_n-Q=(R_2)_m$$

wherein Q is a heterocyclic ring structure which may be substituted or unsubstituted and contains at least one sulfur or nitrogen atom in the ring; $R_1$ is independently at each occurrence a monovalent radical containing no more than 55 weight percent carbon and at least one sulfur or nitrogen atom; $R_2$ is independently at each occurrence a divalent radical containing fewer than 10 atoms other than hydrogen and at least one sulfur or nitrogen atom; $n$ is 0 or an integer of 1 through 6 and the sum of $n$ and $2m$ is no greater than six with the proviso that said compound contains at least one nitrogen atom and at least one sulfur atom, contains no noncyclic imine group and the ratio of the number of carbon atoms in the compound to the total number of atoms having an atomic weight number greater than two other than carbon in the compound being 2:1 or less, said compound including no carbon atom chain containing over six carbon atoms and being free of phosphorous, arsenic, halogens, and hexavalent sulfur which is directly bonded to a carbon atom.

31. The process according to claim 30 wherein $R_2$ is selected from =S, and

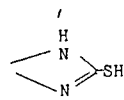

32. The process according to claim 31 wherein $R_1$ is selected from —SH; —NR₃R₄ wherein $R_3$ and $R_4$ are each independently at each occurrence hydrogen or methyl;

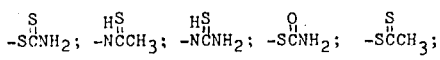

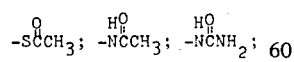

—SCH₃; —SCN; or —SM wherein M is an ion having a single positive charge selected from simple or complex ions of ammonium, Li, Na, K, Cs, Ca, Mg, Sn, Ni, Cu, Ti, Zr, Cr, Mn, Fe, Co, Zn and Al.

33. The process according to claim 32 wherein Q is a four to six membered heterocyclic ring containing nitrogen.

34. The process according to claim 33 wherein the compound is:

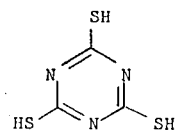

35. The process according to claim 33 wherein the compound is:

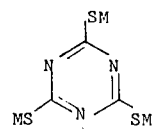

36. The process according to claim 33 wherein the compound is:

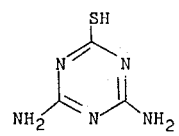

37. The process according to claim 30 wherein the nylon composition comprises nylon fiber.

38. A process according to claim 37 wherein the nylon fiber is treated by wetting the fiber with a solution of from about 0.5 to about 16 weight percent of compound.

39. A process according to claim 37 wherein said compound is stable in nylon melt and from about 0.5 to about 16 weight percent said compound is incorporated into the nylon prior to spinning.

40. A process according to claim 30 wherein the nylon is treated by incorporating from about 0.5 to about 8 weight percent of compound into the nylon polymerization reaction.

41. A process according to claim 30 wherein said compound is stable in nylon melt and the nylon is treated by incorporating from about 0.5 to about 16 weight percent of compound into the nylon prior to molding.

* * * * *